United States Patent
Chung et al.

(10) Patent No.: US 7,274,422 B2
(45) Date of Patent: Sep. 25, 2007

(54) LIQUID CRYSTAL DISPLAY PANEL

(75) Inventors: In Jae Chung, Kyongsangbuk-do (KR); Gui Bok Park, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/994,672

(22) Filed: Nov. 23, 2004

(65) Prior Publication Data

US 2005/0088604 A1 Apr. 28, 2005

Related U.S. Application Data

(62) Division of application No. 09/941,628, filed on Aug. 30, 2001, now Pat. No. 6,839,122.

(30) Foreign Application Priority Data

Nov. 22, 2000 (KR) .................. 10-2000-0069455

(51) Int. Cl.
*G02F 1/1339* (2006.01)
*G02F 1/1333* (2006.01)

(52) U.S. Cl. ....................... 349/153; 349/34

(58) Field of Classification Search ........... 349/153, 349/43, 33–34, 143
See application file for complete search history.

(56) References Cited

U.S. PATENT DOCUMENTS

| | | | |
|---|---|---|---|
| 4,411,496 A * | 10/1983 | Nonomura et al. ........... 349/34 | |
| 4,974,939 A | 12/1990 | Yamazaki et al. | |
| 5,148,301 A | 9/1992 | Sawatsubashi et al. | |
| 5,166,085 A | 11/1992 | Wakai et al. | |
| 5,396,356 A | 3/1995 | Fukuchi | |
| 5,706,069 A * | 1/1998 | Hermens et al. ............. 349/153 |
| 5,754,267 A | 5/1998 | Izumi | |
| 5,929,959 A | 7/1999 | Iida et al. | |
| 6,011,607 A * | 1/2000 | Yamazaki et al. .......... 349/153 |
| 6,018,380 A | 1/2000 | Hu et al. | |
| 6,246,454 B1 * | 6/2001 | Koyama et al. .............. 349/40 |
| 6,317,186 B1 * | 11/2001 | Miwa et al. ................. 349/153 |
| 6,862,069 B2 * | 3/2005 | Kwak et al. ................. 349/143 |

FOREIGN PATENT DOCUMENTS

| | | |
|---|---|---|
| JP | 06-160821 | 6/1994 |
| JP | 08-129161 | 5/1996 |

* cited by examiner

*Primary Examiner*—Toan Ton
(74) *Attorney, Agent, or Firm*—Morgan, Lewis & Bockius LLP

(57) ABSTRACT

The invention relates to an LCD panel for preventing the generation of blur due to ionic impurities. The LCD panel comprises a first substrate having a common electrode; a second substrate having an active area; a seal pattern along the periphery of said active area between said first substrate and said second substrate; a liquid crystal layer between said first substrate and said second substrate in said active area; and an electrode pattern between said seal pattern and said second substrate. Alternatively, the seal pattern has outwardly projecting corner portions. An electric field is generated between the electrode pattern and the common electrode so that the ionic impurities are prevented from penetrating into the active area, and the ionic impurities in liquid crystal are captured in the seal pattern portion to prevent the generation of blur due to ionic impurities.

10 Claims, 3 Drawing Sheets

LIQUID CRYSTAL DISPLAY PANEL

This is a divisional application of application Ser. No. 09/941,628 filed on Aug. 30, 2001 now U.S. Pat. No. 6,839,122. The present invention claims the benefit of Korean Patent Application No. P2000-69455 filed in Korea on Nov. 22, 2000, which is hereby incorporated by reference.

BACKGROUND OF THE INVENTION

1. Field of the Invention

The present invention relates to a liquid crystal display device, more particularly, to a liquid crystal display panel in which blur due to ionic impurities generated during the sealing process is avoided.

2. Background of the Related Art

In general, the liquid crystal display (LCD) panel comprises upper and lower glass substrates with liquid crystal sealed in between the upper and lower glass substrates.

The lower glass substrate has a plurality of gate lines arranged in one direction with a certain distance between them and data lines arranged along another direction perpendicular to said gate lines with a certain distance between them to define rectangular pixel areas arranged in a matrix. Each of the pixel areas includes a thin film transistor (TFT) which has a gate electrode connected to one of the gate lines, a source electrode connected to one of the data lines, and a drain electrode connected to one of the pixel electrodes.

The upper glass substrate has a black matrix, a color filter layer and common electrode formed thereon.

The lower glass substrate and the upper glass substrate, as described above, are attached, leaving a space between the substrates, using a sealing material (sealant) in a seal pattern along the periphery of the substrates. Liquid crystal is then injected into the space between the upper and lower glass substrates.

A seal pattern of related art used for sealing the upper and lower glass substrates together will be described in reference to the FIGS. 1, 2 and 3.

FIG. 1 is a plan view of a seal pattern in a sealing area between upper and lower transparent substrates of the related art. FIG. 2 is a magnification of a part B in FIG. 1, and FIG. 3 is a partial sectional view of part C in FIG. 1.

As described above, the lower substrate 2 having signal lines (not shown), pixel electrodes 3 and TFTs (not shown) is attached to the upper substrate 1 having a black matrix (not shown), a color filter layer (not shown) and common electrode 4. The lower substrate 2 is spaced a predetermined distance from the upper substrate 1 by a seal pattern S. Liquid crystal is injected into an active area A of the LCD and then the area where the liquid crystal was injected is sealed by a sealing agent E, as shown in FIG. 1.

In other words, the upper and lower glass substrates are put together after printing the seal pattern S in an outline portion of the active area of the upper or lower glass substrate by a silk screen printing through a seal mask, and then liquid crystal is injected through an injection hole, which is followed by sealing the injection hole with the sealing agent E.

The corner portions of the seal pattern S are substantially a perpendicular rectangular shape as shown in FIG. 2.

The seal pattern of the related art LCD has the following problems:

First, impurity ions existing on the surfaces of the substrates are carried by the surface of the liquid crystal in a capillary phenomenon when the liquid crystal is injected in between the substrates. Accordingly, the impurity ions (e-) are deposited at the corner portions of the display panel in relatively larger amounts. Such impurity ions (e-) are activated at a high temperature of about 50 degrees and generate blurs at the corner portions of an operating LCD.

Second, ionic impurities existing within the seal pattern can migrate into the liquid crystal causing electric field distortion and thus generating blur in the active area A of a LCD. In other words, when the electric field is applied between the common electrode 4 and the pixel electrode 3 to induce the liquid crystal to have a different alignment, the pre-existing ionic impurities (e-) in the seal pattern can penetrate into the liquid crystal in the active area A. The ionic impurities (e-) can then be adsorbed into the surface of the common electrode 4 and function as resistance components, so that electric field distortion will take place and result in blur in the active area A.

SUMMARY OF THE INVENTION

Accordingly, the present invention is directed to a Liquid Crystal Display (LCD) panel that substantially obviates one or more of the problems due to limitations and disadvantages of the related art.

An object of the invention is to provide an LCD panel in which electrodes are arranged so that the electrodes can apply voltage to the lower part of a seal pattern to prevent ionic impurities from penetrating into an active area and to capture ionic impurities from the active areas.

Also, it is another object of the invention to provide an LCD panel that provides spaces or projections in corner portions of a seal pattern to collect impurities within the panel so that the generation of blur in the corner portions of an LCD panel can be prevented.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the LCD-panel includes a first substrate having a common electrode; a second substrate having an active area; a seal pattern formed peripherally to said active area, and between said first substrate and said second substrate; a liquid crystal layer between said first substrate and said second substrate, and on the active area; and an electrode pattern adjacent to said seal pattern and outside said active area.

In another aspect, the LCD panel includes a first substrate having a common electrode; a second substrate having an active area; a seal pattern formed peripherally to said active area between said first substrate and said second substrate, and having projected corner portions; and a liquid crystal layer between said first substrate and said second substrate in said active area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
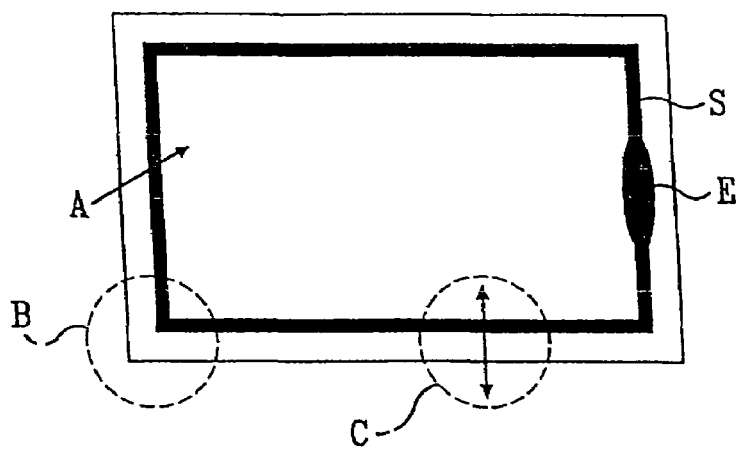
FIG. 1 is a plan view of a seal pattern in a sealing area between upper and lower transparent substrates of the related art.
Figure 2:
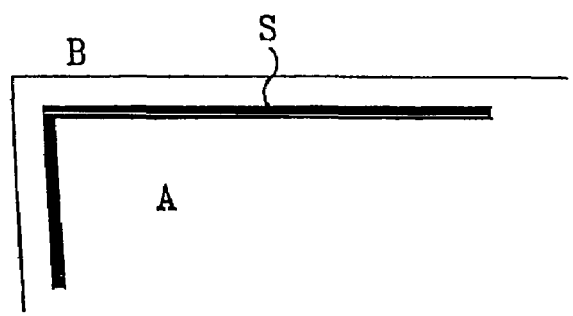
FIG. 2 is a magnification of a part B in FIG. 1.
Figure 3:
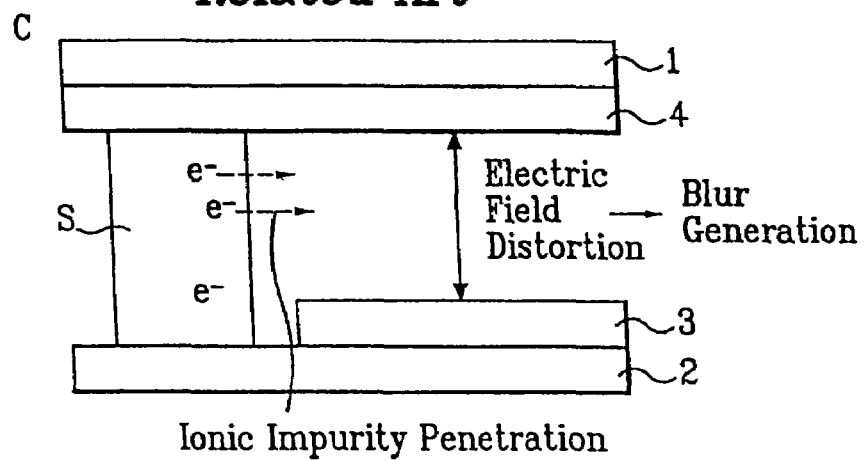
FIG. 3 is a partial sectional view of part C in FIG. 1.
Figure 4:
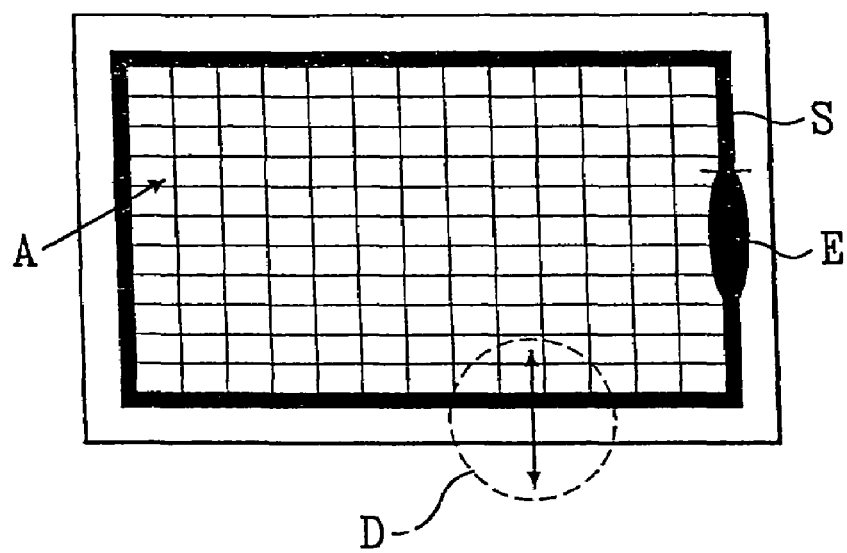
FIG. 4 is a plan view of a seal pattern according to the first embodiment of the present invention.
Figure 5:
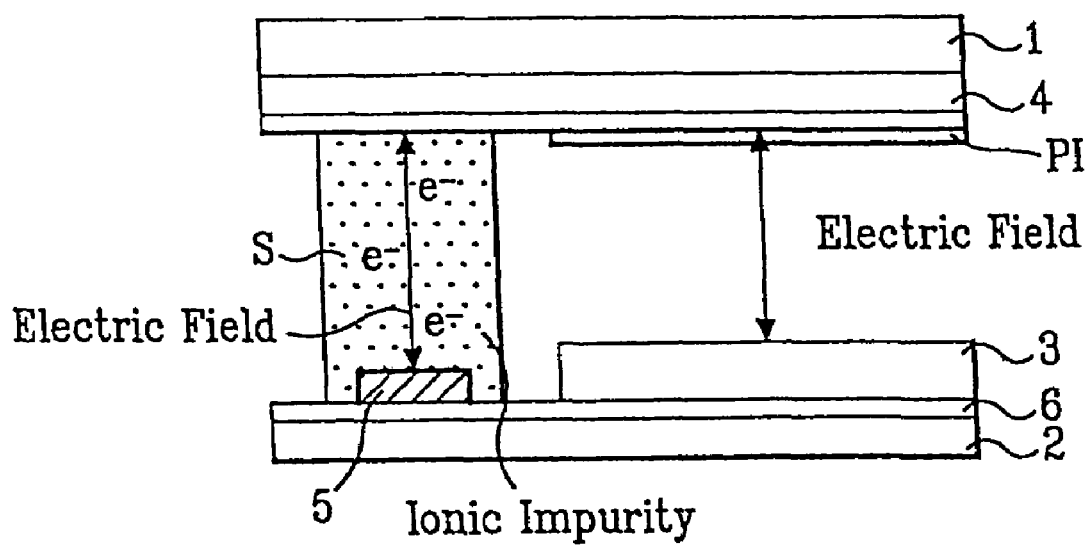
FIG. 5 is a sectional view of a part D in FIG. 4.
Figure 6:
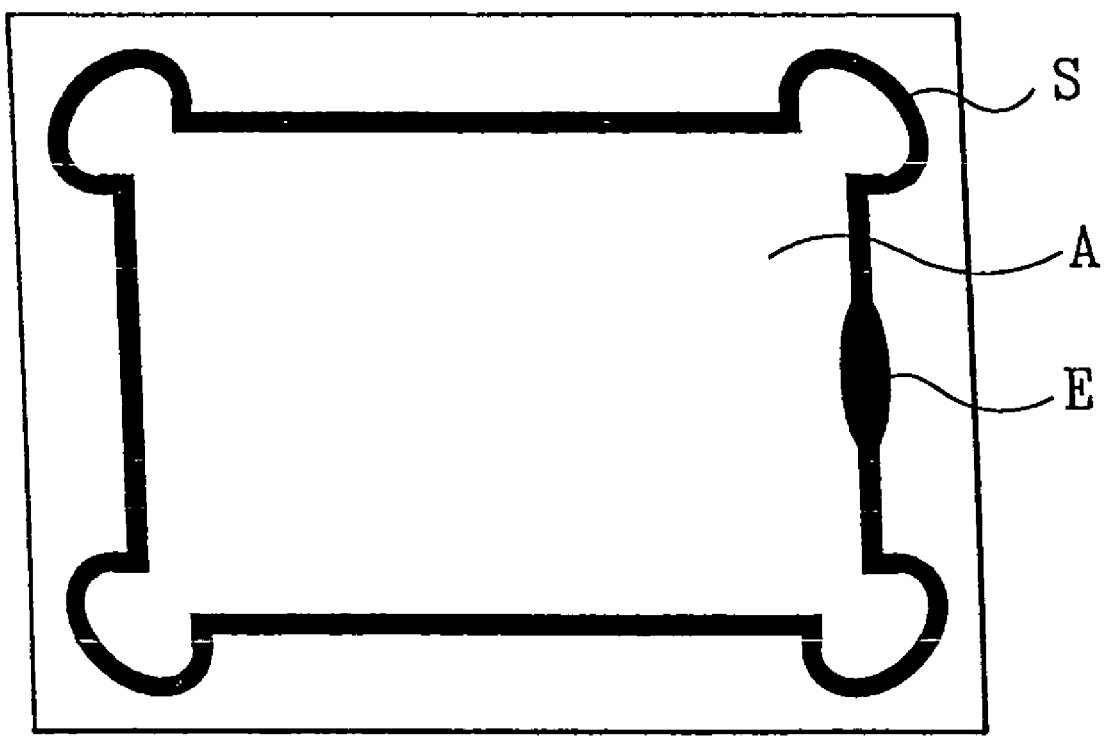
FIG. 6 is a plan view of a seal pattern according to the second embodiment of the present invention.

FIG. 4 is a plan view of a seal pattern according to the first embodiment of the present invention, FIG. 5 is a sectional view of a part D in FIG. 4, and FIG. 6 is a plan view of a seal pattern according to the second embodiment of the present invention.

As shown in FIG. 4 and FIG. 5, after being printed with a seal pattern S having an injection hole, a lower glass substrate 2 is put together with an upper glass substrate 1 with a predetermined distance separating the substrates. The seal pattern S is coated on the lower substrate 2 by a silk screen printing using a seal mask so as to outline the active area A of the LCD panel. After injecting liquid crystal through the injection hole of the seal pattern, the injection hole is then closed with a sealing agent E.

The lower substrate 2 has, not shown in the drawings, a plurality of gate lines (not shown) arranged with a predetermined distance separating them, an insulation film (not shown) for insulating the gate lines, a plurality of data lines (not shown) arranged on the insulation film with a predetermined distance separating them in a direction perpendicular to the gate lines, and a plurality of TFTs (not shown). The plurality of data lines and gate lines defining pixel areas form a matrix-shaped arrangement. Where each of the pixel areas has a TFT where the gate lines and the data lines intersect for transferring data signals of the data lines to each corresponding pixel electrode in response to signals of the gate lines. Also, a protective film 6 is formed to insulate each of the TFTs and each of the data lines. The pixel electrode 3 in each pixel area is formed on the protective film 6 and electrically connected with drain electrode. The portion of the lower substrate in which the gate lines and the data lines intersect to define pixel areas is an active area A, and a seal pattern S is formed along the periphery of the active area A.

Also, a black matrix (not shown in the drawings), a color filter layer (not shown) and transparent common electrode 4 are formed in the upper substrate 1.

An electrode pattern 5 is formed between the seal pattern and the protective film 6 of the lower glass substrate 2 to capture ionic impurities within the seal pattern S. The electrode pattern 5 may also be formed for the injection hole or on an adjacent portion of the lower substrate 2 outside the seal pattern. When simultaneously formed of the same material as the pixel electrodes 3, the electrode pattern 5 can be formed without adding an additional process step.

In the alternative, the device of the present invention can have a color filter on transistor (COT) structure in which the color filter layer is formed above the TFT on the lower substrate, or a substrate having a transistor on color filter (TOC) structure in which the color filter is formed below the TFT on the lower substrate.

After the electrode pattern 5 is arranged in the seal pattern S formed as described above, an electric field is applied between the common electrode 4 and the pixel electrodes 3, and between the common electrode 4 and the electrode pattern 5. The molecular arrangement of liquid crystal layer in the active area A is changed due to the generation of the electric field between the pixel electrodes 3 and the common electrode 4. Also at the same time, due to the electric field between the common electrode 4 and the electrode pattern 5, the ionic impurities e− in or at the seal pattern are prevented from penetrating into the active area A, and ionic impurities e− in the liquid crystal of the active area A are captured within the seal pattern S.

The voltage applied between the common electrode 4 and the pixel electrode 3 can be different than the voltage between the common electrode 4 and the electrode pattern 5. Therefore, an additional DC bias can be applied to the electrode pattern 5, or a common voltage applied to the common electrode 4 can be stepped down in application. The common voltage applied to the common electrode 4 can be reversed in polarity in application in the case of dot inversion operation and the electrode pattern 5 should be at a voltage that will collect the ionic impurities. Also the voltage of the electrode pattern 5 can have a polarity reversed from that of the voltage applied to said common electrode 4.

The LCD panel according to the second embodiment of the invention includes an upper substrate and a lower substrate put together with a seal pattern S having a structure with projected corner portions in the seal area between the substrates, as shown in FIG. 6.

As described in the related art, the corner portions are areas with a high density of ionic impurities since preexisting ionic impurities within the panel are carried to the corner portions of the seal pattern by the injected liquid crystal. Therefore, the corner portions of the seal pattern S according to the second embodiment of the present invention are outwardly projected so that the ionic impurities can be collected within the projected portions at the corners of the seal pattern.

Of course, as in the first embodiment of the invention, it is also effective to form the electrode pattern 5 between the seal pattern S and the lower substrate or on portions of the lower substrate adjacent to the seal pattern S. Also, the electrode pattern 5 can be formed on the lower substrate where an injection hole sealant is positioned.

It will be apparent to those skilled in the art that various modifications and variations can be made in the LCD panel of the present invention without departing from the spirit or scope of the invention. Thus, it is intended that the present invention cover the modifications and variations of this invention provided they come within the scope of the appended clams and their equivalents.

What is claimed is:

1. A liquid crystal display device comprising:
   a first substrate having a common electrode;
   a second substrate having an active area;
   a seal pattern formed peripherally to said active area, and between said first substrate and said second substrate;
   a liquid crystal layer between said first substrate and said second substrate, and on the active area;

an electrode pattern encapsulated by said seal pattern on three sides of the electrode pattern and outside said active area; and an electric field between said electrode pattern and said common electrode.

2. The device of claim 1, wherein the electric field is formed when said electrode pattern is applied with a voltage which is stepped down from a common voltage applied to said common electrode.

3. A liquid crystal display device comprising:
a first substrate having a common electrode;
a second substrate having an active area;
a seal pattern formed peripherally to said active area between said first substrate and said second substrate, and having projected corner portions;
a liquid crystal layer between said first substrate and said second substrate in said active area;
an electrode pattern formed on the second substrate, the electrode pattern completely embedded within a lengthwise portion of the seal pattern and directly covered by the seal pattern along three sides of the electrode pattern; and
an electric field between the electrode pattern and the common electrode.

4. The device of claim 3, wherein said electrode pattern is between said seal pattern and said second substrate.

5. The device of claim 3, wherein said second substrate comprises:
data lines and gate lines arranged in a matrix shape to define pixel areas;
a TFT at an intersection of a data line and a gate line;
a protective film on the TFT; and
a pixel electrode on said protective film.

6. The device of claim 5, wherein said electrode pattern is between said seal pattern and said protective film.

7. The device of claim 5, wherein said electrode pattern is made of the same material as said pixel electrode.

8. The device of claim 5, wherein said electrode pattern is formed at the same time as said pixel electrode.

9. The device of claim 3, wherein said electrode pattern is applied with a voltage which is stepped down from a common voltage applied to said common electrode.

10. The device of claim 3, wherein the electric field is formed by application of a voltage to the electrode pattern and the common electrode.

* * * * *